(12) United States Patent
Berezhnyy et al.

(10) Patent No.: US 9,573,598 B2
(45) Date of Patent: Feb. 21, 2017

(54) DETECTION SYSTEM USING PHOTO-SENSORS

(71) Applicant: KONINKLIJKE PHILIPS N.V., Eindhoven (NL)

(72) Inventors: Igor Berezhnyy, Eindhoven (NL); Gary Nelson Garcia Molina, Madison, WI (US); Mirela Alina Weffers-Albu, Boukoul (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/430,929

(22) PCT Filed: Sep. 12, 2013

(86) PCT No.: PCT/IB2013/058473
§ 371 (c)(1),
(2) Date: Mar. 25, 2015

(87) PCT Pub. No.: WO2014/053928
PCT Pub. Date: Apr. 10, 2014

(65) Prior Publication Data
US 2015/0217776 A1    Aug. 6, 2015

Related U.S. Application Data

(60) Provisional application No. 61/710,153, filed on Oct. 5, 2012.

(51) Int. Cl.
G08B 23/00 (2006.01)
B60W 40/09 (2012.01)
(Continued)

(52) U.S. Cl.
CPC .............. *B60W 40/09* (2013.01); *B60K 28/06* (2013.01); *B60K 28/066* (2013.01); *B60W 50/14* (2013.01);
(Continued)

(58) Field of Classification Search
CPC ................. B60W 40/09; B60W 50/14; B60W 2040/0827; G01P 13/00; B60K 28/06; B60K 28/066; G08B 21/06
(Continued)

(56) References Cited

U.S. PATENT DOCUMENTS 4,224,609 A * 9/1980 Yanagishima ......... G08B 21/06
                                                              180/272
4,438,425 A * 3/1984 Tsuchida ............... B60R 16/027
                                                              250/551

(Continued)

FOREIGN PATENT DOCUMENTS

CN    202368648 U    8/2012
GB    2383170 A    6/2003
(Continued)

OTHER PUBLICATIONS

R. Sayed et al; "Unobtrusive Drowsiness Detection by Neural Network Learning of Driver Steering", Proc. of the Institution of Mechanical Engineers, 2001, vol. 215, Part D. pp. 969-975.
(Continued)

*Primary Examiner* — Tanmay Shah

(57) ABSTRACT

The present invention relates to system for determining a movement of a control device and a system for detecting drowsiness of a driver of a vehicle, as well as an according processing unit used for this purpose and an according method. The system (12) for determining a movement comprises a plurality of light sensors (16), a processing unit (14) and an interface (18), wherein the light sensors (44-58)
(Continued)

are able to transmit light intensity information to the processing unit (14) and the latter is able to provide information to a user. Further, the processing unit (14) is able to determine the movement of the control device based on the light intensity information submitted by the light sensors (44-58).

9 Claims, 4 Drawing Sheets

(51) Int. Cl.
    *B60K 28/06*     (2006.01)
    *G08B 21/06*     (2006.01)
    *B60W 50/14*     (2012.01)
    *G01P 13/00*     (2006.01)
    *B60W 40/08*     (2012.01)

(52) U.S. Cl.
    CPC .............. *G01P 13/00* (2013.01); *G08B 21/06* (2013.01); *B60W 2040/0827* (2013.01)

(58) Field of Classification Search
    USPC .......................................................... 340/576
    See application file for complete search history.

(56) References Cited

U.S. PATENT DOCUMENTS

| | | | |
|---|---|---|---|
| 4,635,029 A | | 1/1987 | Yamada |
| 5,055,668 A | * | 10/1991 | French ................ G01D 5/26 |
| | | | 250/208.2 |
| 6,114,949 A | | 9/2000 | Schmitz et al. |
| 2005/0189159 A1 | | 9/2005 | Weber et al. |
| 2011/0133919 A1 | | 6/2011 | Evarts et al. |
| 2014/0172467 A1 | * | 6/2014 | He ...................... B60K 28/066 |
| | | | 705/4 |

FOREIGN PATENT DOCUMENTS

| | | |
|---|---|---|
| JP | S63222978 A | 9/1988 |
| JP | 2001158375 A | 6/2001 |
| WO | 2006069746 A1 | 7/2006 |

OTHER PUBLICATIONS

F. Friedrichs et al; "Drowsiness Monitoring by Steering and Lane Data", Cone Proc. of EUSIPCO, Aug. 23-27, 2010 Aalborg, Denmark, pp. 209-213.

A Eskandarian et al; "Evaluation of a Smart Algorithm Form Commercial Vehicle Driver Drowsiness Detection", Conf Proc of IEEE Intelligent Vehicles Symposium, Jun. 13-15, 2007 Istanbul, Turkey pp. 553-559.

* cited by examiner

DETECTION SYSTEM USING PHOTO-SENSORS

CROSS-REFERENCE TO PRIOR APPLICATIONS

This application is the U.S. National Phase application under 35 U.S.C. §371 of International Application No. PCT/IB13/058473, filed on Sep. 12, 2013, which claims the benefit of U.S. Provisional Patent Application No. 61/710, 153, filed on Oct. 5, 2012. These applications are hereby incorporated by reference herein.

FIELD OF THE INVENTION

The present invention relates to a system for detecting drowsiness of a driver, a system for determining the movement of a control device of a vehicle used for the former system, a processing unit used in either one of the systems as well as to a method for detecting drowsiness of a driver of a vehicle.

BACKGROUND OF THE INVENTION

Drowsiness detection systems become more and more popular and established in today's cars, especially in cars sold by so-called premium-brands.

Those systems directed to monitor and control the driver's fitness and, for example, alarm the driver in the case of lack of fitness are normally still very expensive and even in the aforementioned premium-brands often only available as additional expensive premium packages.

The working principle of these known systems is to monitor the driver with regard to such aspects as steering wheel control, lane deviation etc. If, while monitoring those aspects, the system detects patterns that indicate drowsiness the driver is informed of this fact, either via sound or the car's information display in the dashboard, for example.

For the control of lane deviation, known systems are based on cameras that control the road markings and the car's position with respect to those road markings. If the car leaves the lane between those road markings without any apparent reason, for example, an intended switch of lanes indicated by the turn indicator, the system warns the driver accordingly.

Since those systems are based on the processing of the continuous image data delivered by the camera to the system, the system itself has to be equipped with resource demanding video processing algorithms. Due to the high demand on those resources, like computing power and memory, the system gets very expensive and/or is inaccurate or unreliable in many situations, especially during nighttime when drowsiness detection is most relevant.

Monitoring the steering wheel control is realized in the available systems by accessing the car's subsystems in order to get the steering wheel actuation information. Such a drowsiness detection system therefore needs to be completely embedded in the car's electronic systems in order to function properly. Accordingly, those systems, as well as the aforementioned video based systems, have to be included at the time of ordering the car into its electronic systems and into the whole vehicle.

SUMMARY OF THE INVENTION

It is therefore an object of the present invention to provide a system for detecting drowsiness of a driver of a vehicle, an according system usable for such a detection and monitoring as well as a method and processing unit for this purpose, that is working properly and accurately without needing a lot of resources, works totally reliable during nighttime, is able to be installed as an upgrade in an existing and already totally configured vehicle and is preferably relatively cheap.

In a first aspect of the present invention a processing unit is provided with a processor, a data interface and memory, the memory storing one or more routines executable by the processor, wherein the processing unit is able to receive data from a plurality of photo-sensors via the data interface, and wherein the one or more routines being adapted to:

determine movements of the plurality of photo-sensors relative to at least one light source based on the change of light intensity information received from the plurality of photo-sensors with respect to time. Using photo-sensor information in order to determine a movement is less resource demanding compared with the video based methods mentioned before. The processor as well as the memory of the processing unit may therefore be comparably cheap. Further, such a processing unit and the system as will be described in the following, allow a separate detection, independent of the car's system. Therefore, the devices according to the present invention can be installed in a vehicle as an upgrade. For this, only a few technical steps/modifications are necessary. Therefore, the upgrade is even realizable in an easy and cheap way.

According to a further aspect of the present invention a system for determining a movement of a control device is provided, with a plurality of photo-sensors,
a processing unit, and
an interface, wherein the plurality of photo-sensors is able to transmit light intensity information to the processing unit and the processing unit is able to receive the light intensity information from the photo-sensors, wherein the processing unit is able to provide information to a user via the interface, and wherein the processing unit is designed to determine the movement of the control device based on the change in the light intensity information submitted by the photo-sensors.

The term "control device" as used within the context of the present invention is to be understood as any device or element on a machinery that is used in order to control elements of the machinery or to control the machinery itself. Preferably such a "control device" is to be understood as a control stick or steering wheel in order to control a vehicle, like but limiting to cars, trains, ships, airplanes, and even more preferably understood as a steering wheel of a car.

As already mentioned within the context of the processing unit according to the present invention, the system is also able to be designed as its own entity, meaning is able to be installed as an upgrade in an already existing and manufactured vehicle, like a car. The information that may be provided to a user via the interface can be any suitable information informing the user about the movement. This information can be the basic information related directly to the movement, like direction and intensity, for example, or may also be processed information that show the user the amount of certain movements in a predetermined time interval. Furthermore, this information can even be further processed and be related to a processing of these raw data of movement and, for example, may indicate the drowsiness of the driver. Accordingly, the information provided via the interface to a user can indicate the level of drowsiness or may even just be an optical or sound signal if a certain predetermined threshold of drowsiness is reached or passed. The plurality of photo-sensors allows to more accurately determine the movement. With two or more photo-sensors and the possibility to put the information from the photo-sensors in relation to each other, a determination of the direction of the movement with respect to a light source is possible. For example, if a linear array of photo-sensors is oriented towards a light source such that a first photo-sensor is the closest one to the light source whereas the fourth photo-sensor is the farthest, the latter may detect the lowest light intensity whereas the first photo-sensor detects the highest light intensity with respect to all photo-sensors in this array. Photo-sensors 2 and 3 would then accordingly be arranged between these two and their light intensities may be in the range between photo-sensor 1 and photo-sensor 4. If then the orientation of this exemplary array is kept but the array is moved past the light source in the other direction, such that photo-sensor 4 is now the closest and photo-sensor 1 is the farthest, the measured light intensities will shift accordingly. As a result, photo-sensor 4 now shows the highest light intensity whereas photo-sensor 1 shows the lowest. With now comprising a plurality of photo-sensors, a detailed information about the movement and even about the position of the (array of) photo-sensors can be derived. Also, the overall sensitivity for detecting and analyzing slight movements is increased by this array-like arrangement.

According to a further aspect of the present invention a method for detecting drowsiness of a driver of vehicle is provided, with the following steps:
  receiving light intensity information from a plurality of photo-sensors,
  determining movements based on the change of the light intensity information, and
  analyzing the movements for drowsiness indicating patterns. Using light intensity information is a simple way for determining movements, for example of a control device, like the steering wheel of a vehicle. Furthermore, this way of determining the movements is easy to be realized in any car independent of the brand and of its age. Light intensity information is further a simple information format that can be easily analyzed and therefore leads immediately to the desired information regarding the movements and also regarding the drowsiness of the driver.

Preferred embodiments of the invention are defined in the dependent claims. It shall be understood that the claimed method has similar and/or identical preferred embodiments as the claimed device and as defined in the dependent claims.

In an embodiment of the processing unit the one or more routines are further adapted to:
  determine a position of the plurality of photo-sensors relative to a light source based on light intensity information, and to
  determine the movements based on the change in position. In this exemplary embodiment, the movements, which may be used in order to determine drowsiness of a driver, are detected by the difference in position of the mentioned photo-sensors. Accordingly, for example, the processing unit is able to determine the actual (relative) position of the photo-sensors and further to determine a change in position due to the comparison with earlier position information. This can be realized for example by storing a certain position of the photo-sensors after its determination in the memory of the processing unit, for example on a regular basis with a predetermined time interval.

According to another embodiment of the processing unit, the one or more routines are further adapted to:
  determine the change in the light intensity information of the plurality of photo-sensors by directly comparing the light intensity information, and to
  determine the movements based on this comparison of light intensity information. By using the light intensity information directly, the processing unit is able to detect and determine the relative movements based on the pure light intensity information delivered by the photo-sensors. These light intensity information can also be stored in the memory and be used for determining the change via a comparison of a momentary reading with stored light intensity information. This storing of light intensity information can also be realized in a continuous way, that is to say by storing an actual reading of the light intensity information delivered by the photo-sensors repeatedly in a predetermined time interval.

According to an embodiment of the system of the present invention, the plurality of photo-sensors and the processing unit are combined in a sensor element comprising attaching means for attaching the sensor element on the control device. With such a design of the system the processing unit can be built together with the photo-sensors in one device that can be used as an important part of an upgrade kit. This part, meaning the sensor element, can be arranged on the control device, for example the steering wheel of a car. For this the sensor element comprises attaching means, like but limited to adhesives, adhesive tape, glue, screws, or the like.

In another embodiment of the system, the system further comprises a light source for providing light to the plurality of photo-sensors. By further comprising a separate light source the system can be arranged with respect to the control device of which the movement shall be determined by either attaching the light source to the control device and the plurality of light sensors on a non-movable part beneath the control device, or with the light source on a non-movable part beneath the control device and the plurality of photo-sensors on the control device itself. With these parts, the whole system is able to be arranged in such a way that the light source is oriented directly towards the plurality of photo-sensors which allows an accurate determination of the movement.

In another embodiment of the system, the light source provides patterned light.

The term "patterned light" as used within the context of the present invention is to be understood as light modulated by a certain pattern of, for example, but not limited to colors or alterations in light intensity, or also as a light that is modulated in a timely dimension, like but not limited to flickering.

By using patterned light the accuracy of the whole system can be further improved, for example if the photo-sensors also detect the color information of the light and this information changes on the path of the photo-sensors during the movement. Further, such patterns as flickering can be used, preferably with a high frequency, such that this light is not perceivable by the human eye and does not disturb a user of the control device. Also, the robustness of the system can be enhanced this way since the system may be focused on the light with the known pattern whereas other interfering light, e.g. from external light sources, might be easily disregarded by the system.

According to another embodiment of the system, the light source provides infrared light. Using infrared light has the effect that this light is not perceivable for the human eye and does not disturb the user of the control device, for example the driving of a driver of a car. Further, infrared light can also be used during day and nighttime without or with a minimum of external interferences. Therefore, infrared light further improves the reliability and robustness of the detection, especially during nighttime.

According to another embodiment of the system, the system comprises 4 to 12, preferably 6 to 10 and more preferably 8 photo-sensors. As mentioned before, a plurality of photo-sensors improves the accuracy of the whole system and the detection of movement of the control device. The preferred embodiments of the present invention therefore use numbers of photo-sensors that are an optimal compromise between using as few photo-sensors as possible in order to reduce the overall costs and the amount of data to be processed by the processing unit as well as using enough photo-sensors in order to provide an optimal detection of the movement according to the present invention.

According to another embodiment of the system, the processing unit is a processing unit according to the present invention and as mentioned before.

According to a further aspect of the present invention, a system for detecting drowsiness of a driver of vehicle is provided with a system for detecting the movement of a control device according to the present invention and as mentioned before. Based on the beneficial detection of movement of a control device as outlined in the embodiments as mentioned before, the system for detecting drowsiness may detect and also inform a driver of a vehicle of his/her drowsiness based only on this simple setup with photo-sensors and light source and an according processing unit, for example.

According to another embodiment of the method according to the present invention, the method further comprises the step of:
  determining a position of the plurality of photo-sensors relative to a light source based on the light intensity information,
wherein the movements are determined based on the change in position. By providing the actual position of a control device, like the steering wheel in a vehicle, aside from detecting drowsiness indicating patterns as mentioned before, the possibility of providing steering direction data is given. These may be easily used in other driver assisting applications.

According to another embodiment of the method according to the present invention, the method further comprises the step of:
  determining the change in the light intensity information of the plurality of photo-sensors by directly comparing the light intensity information,
wherein the movements are determined based on this comparison of light intensity information. This embodiment of the method allows for a directly usage of the light intensity information. This leads to a fast and reliable usage of the provided data, i.e. the light intensity information, and therefore to an efficient analysis of the movement or driving patterns.

According to a further aspect of the present invention a computer program is provided, the computer program comprising program code means for causing a computer to carry out the steps of the method according to the present invention when said computer program is carried out on a computer.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF THE INVENTION

Figure 1:
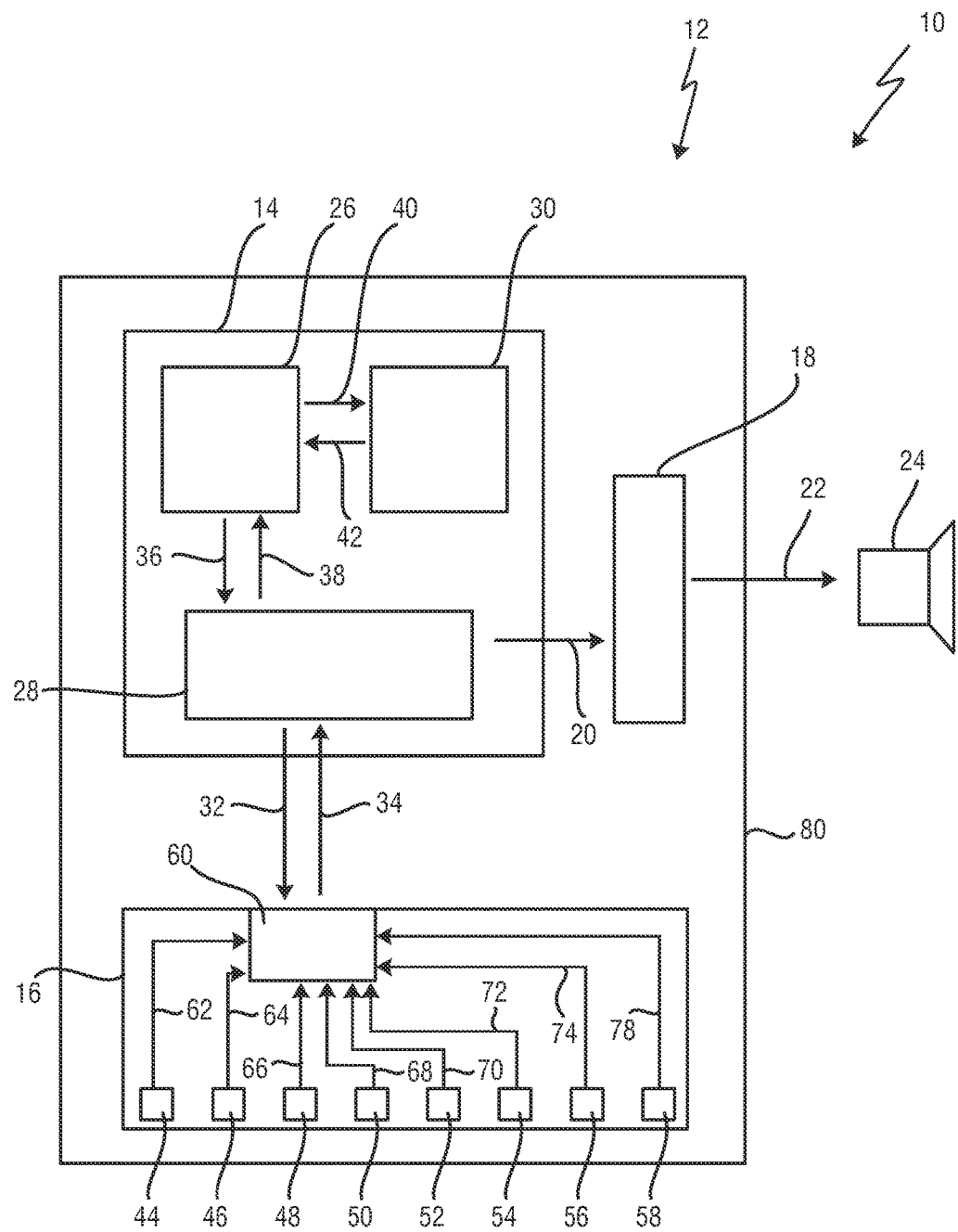
FIG. 1 shows a processing unit, a system for determining a movement of a control device and a system for detecting the drowsiness of a driver of a vehicle according to the present invention in a schematic representation.

A system for detecting drowsiness of a driver of a vehicle is shown throughout and further explained with the help of FIGS. 1 through 5c and designated in its entirety by the reference numeral 10. Further, a system for determining a movement of a control device is shown throughout and is explained with the help of FIGS. 1 through 5c and designated in its entirety by the reference numeral 12. Furthermore, an embodiment of a processing unit according to the present invention is shown throughout and explained with the help of FIGS. 1 through 5c and designated in its entirety by the reference numeral 14.

FIG. 1 shows a system for determining a movement of a control device 12. This system 12 can be used in order to detect a drowsiness of a driver of a vehicle. Therefore, FIG. 1 shows as well a system for detecting drowsiness of a driver of a vehicle 10. Due to the preferred application of a system 12 in order to detect drowsiness of a driver of a vehicle the systems 10 and 12 are used synonym for each other within the following explanations of the preferred embodiments shown throughout FIGS. 1 through 5c. However, this is not to be understood as a limitation of the system 12 towards only detecting drowsiness of a driver of a vehicle.

The system 12 comprises a processing unit 14 a plurality of photo-sensors 16 and an interface 18.

The interface 18 gets information from or is controlled by processing unit 14 as indicated by an arrow 20. The purpose of interface 18 is to provide information to a user, which is indicated by another arrow 22. In the present exemplary embodiment the information to the user is provided via a speaker 24. The information within the present embodiment can therefore be any acoustic information, like but not limiting to an alarm, a warning or informing voice, or the like. Aside from just informing a user, also interactions of the system 12 via interface 18 with other devices are possible, e.g. giving a force feedback to a control device, reducing the speed of a vehicle, or the like.

The processing unit 14 comprises a processor 26, a data interface 28 and a memory 30. The data interface 28 is used by the processing unit 14 in order to communicate with other devices, like the interface 18. The communication between data interface 28 and interface 18 is indicated by the arrow 20. Further, data interface 28 communicates with the plurality of photo-sensors 16. This is indicated by arrows 32 and 34. As indicated by arrow 32, the data interface 28 can provide data commands or further information to the plurality of photo-sensors 16, for example in order to control certain parts of this photo-sensors 16. Further, as indicated by arrow 34, the plurality of photo-sensors 16 can provide information to the processing unit 14, i.e. via the data interface 28. As will be explained later on in more detail, those information provided in accordance with arrow 34 are mostly concerned with the information detected via the plurality of photo-sensors 16, like but not limiting to light intensity information, color information etc. Although illustrated this way, it goes without saying that instead of one single data interface 28 for the communication with interface 18 and the plurality of photo-sensors 16 separate data interfaces may be used.

Data interface 28 may further communicate with the processor 26. This is indicated by arrows 36 and 38. The processor 26 may according to arrow 36 send information or data to the data interface 28 or via the data interface 28 to other devices as mentioned before. Further, the processor 26 may receive data or information from the data interface 28 according to arrow 38, those data may result from the data interface 28 itself or may also be sent via the data interface 28 from other devices as mentioned before.

Also, the processor 26 may exchange data with the memory 30. This is indicated by further arrows 40 and 42. Aside from sending data or information from the processor 26 to memory 30, which is indicated by arrow 40, the processor 26 may as well receive data or information from a memory 30. The latter is indicated by arrow 42. Those processes indicated by arrows 40 and 42 may also be regarded as storing and retrieving data or information in the memory 30. Aside from storing and retrieving data or information to or from memory 30, the processor 26 may also receive or retrieve routines from memory 30 which are then executed on the processor 26. The content and character of those routines will be explained in more detail and become more apparent in the following explanations regarding the working principle and the methods according to the present invention.

The plurality of photo-sensors 16 comprises in this certain embodiment eight photo-sensors 44, 46, 48, 50, 52, 54, 56 and 58. Those photo-sensors 46 to 58 submit data to the processing unit 14. This is realized exemplary in the present embodiment via a hub 60. The photo-sensors 44 to 58 submit the respective data or information to the hub 60, which itself stays in contact to the processing unit 14, as indicated by arrows 32 and 34 and as explained before. The transmission of the data of the photo-sensors 44 to 58 is indicated by arrows 62 to 78.

The combination of the processing unit 14 and the plurality of photo-sensors 16 forms a sensor element 80.

Figure 2:
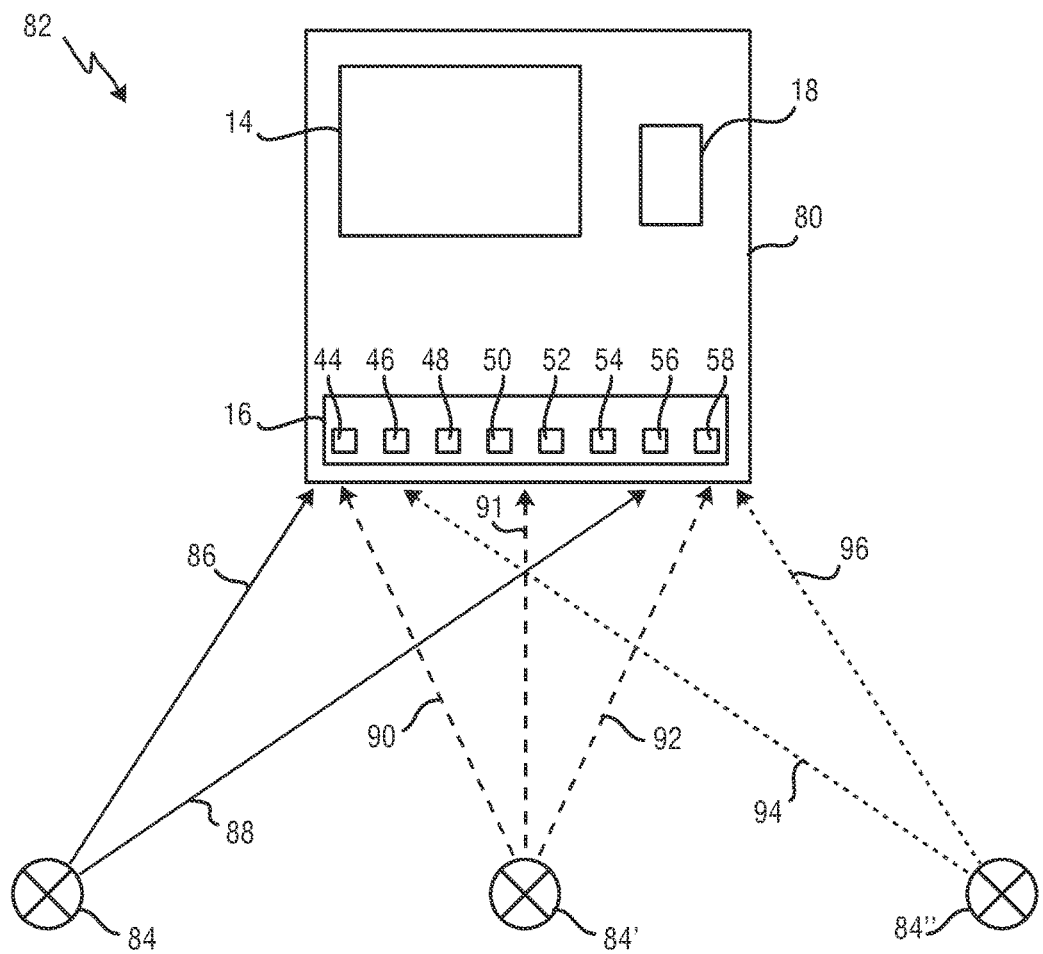
FIG. 2 shows a schematic representation of the system according to the present invention and its mode of operation.

FIG. 2 shows another embodiment of a system 82 for determining a movement of the control device. This system 82 also comprises a sensor element 80 with a processing unit 14, a plurality of photo-sensors 16 and an interface 18. Herein and in the following, the same reference numerals are used for identical features. Further the system 82 comprises a light source 84, which is in the present embodiment an infrared lamp. This light source 84 is shown in three different positions with respect to the sensor element 80, namely as light source 84, 84' and 84". From this light source, light is provided to the plurality of photo-sensors 16 of the sensor element 80, which is indicated by the respective arrows 86 and 88 or 90 and 92 or 94 and 96. The intensity of light that reaches the plurality of photo-sensors 16 from the light source 84 is different for each photo-sensor 44 to 58, as will be explained in more detail in the following. This detected and determined light intensity is submitted to the processing unit 14, for example as explained before within the context of FIG. 1. Within FIG. 2 and the following representations, the details of sensor element 80 may be regarded as identical to the sensor element 80 in FIG. 1. However, not all features of the processing unit 14, the plurality of photo-sensors 16 and the way how data or information are exchanged are shown for clarity reasons in FIG. 2.

The light emitted from light source 84, shown in the left with respect to the representation of FIG. 2, travels different distances towards the plurality of photo-sensors 16, as shown by arrows 86 and 88. With respect to the photo-sensors 44 to 58, the light reaching photo-sensor 44 travels the shortest way whereas the light reaching the photo-sensor 58 travels the longest way. Due to the loss in intensity of the light while travelling, for example due to particles and molecules in the air or the like, the light reaching photo-sensor 44, as indicated by arrow 86, has a higher intensity than the light reaching photo-sensor 58, as indicated by arrow 88. The light reaching the photo-sensors in-between, meaning photo-sensors 46 through 56, has an increasing distance to travel from a photo-sensor 46 through photo-sensor 56 and accordingly shows a decreasing intensity.

The opposite situation is shown by light source 84" shown in the right of the representation of FIG. 2. Therein, the light reaching photo-sensor 44 is indicated by arrow 94 whereas the light reaching photo-sensor 58 is indicated by arrow 96. The travel distance of the light reaching photo-sensor 44 as indicated by arrow 94 is longer than the travel distance of the light reaching photo-sensor 58, indicated by arrow 96. Accordingly, the intensity detected by photo-sensor 44 is lower than the intensity of the light as detected by photo-sensor 58. Analog to the aforementioned, the intensity detected by photo-sensors 46 through 56 increases from 46 to 56 accordingly.

In the situation of light source 84', which is arranged in-between light sources 84 and 84", i.e. in the middle of the representation of FIG. 2, the travel distances towards the photo-sensors 44 and 58, representing the outer photo-sensors of this linear array of photo-sensors of the plurality of photo-sensor 16, is approximately the same. This is indicated by arrows 90 and 92. However, the light reaching the middle of this plurality of photo-sensors 16, i.e. this linear photo-sensor array, travels a shorter distance, as indicated by arrow 91. Therefore, the light reaching the photo-sensors 50 and 52, which are basically arranged in the middle of the plurality of photo-sensors 16, has a higher intensity than the light reaching the outer photo-sensors 44 and 58. The light intensity measured or detected in the plurality of photo-sensors 16 accordingly decreases from the middle towards its sides. This means, that starting from photo-sensors 50 or 52 respectively, the measured intensity decreases towards photo-sensors 44 or the other side to photo-sensor 58.

The result of those detected light intensities by photo-sensors 44 through 58 is therefore an array of light intensities which can be used for determining the relative position of a light source, here the light source 84 represented by light sources 84, 84' and 84". Moving the respective light source 84 results in an according change in the measured light intensities, in this case in the array of measured light intensities by the plurality of photo-sensors 16. The same applies if the plurality of photo-sensors 16 is moved with respect to the light source 84. This situation can be regarded as merely changing the view of the observer. Accordingly, starting from a situation shown by the relationship of the plurality of photo-sensors 16 to the light source 84', the movement of this plurality of photo-sensors 16 towards the left with respect to the representation of FIG. 2 will result in a relationship as shown by photo-sensors 16 to light source 84". Accordingly, moving the plurality of photo-sensors 16 towards the right will result in a position or relationship towards the light source as indicated by the plurality of photo-sensors 16 to light source 84. Since in this embodiment the plurality of photo-sensors 16 is included in the sensor element 80, the same applies for moving this whole sensor element 80 with respect to a light source, like the light source 84.

Figure 3:
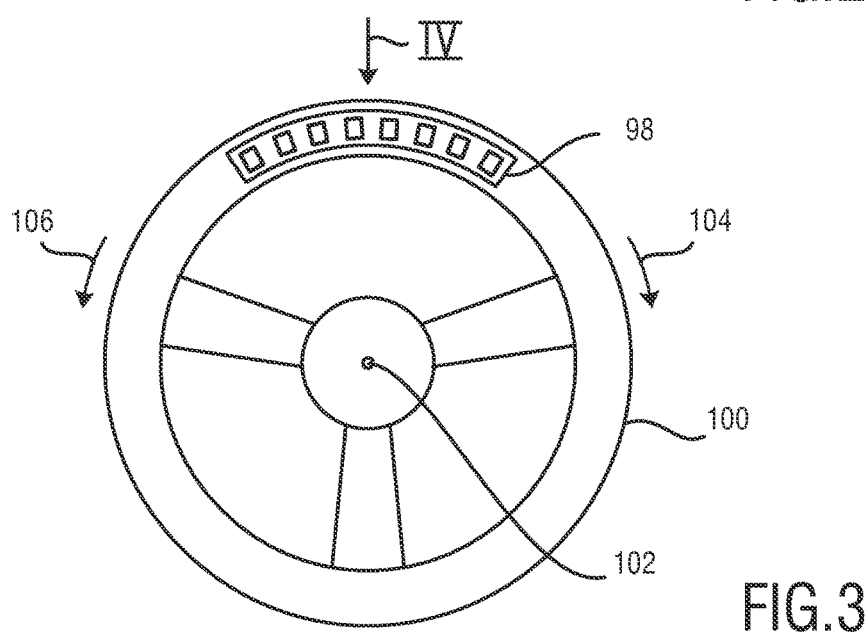
FIG. 3 shows the system according to the present invention mounted on a steering wheel of a car.

Starting with FIG. 3, the working principle and the method according to the present invention shall be described in more detail in an example of a sensor element 98 being arranged on the backside of a steering wheel 100. With the backside of the steering wheel 100 it is referred to that side of a steering wheel that is directing away from a driver, i.e. directed to the front of the vehicle.

The sensor element 98 shown in FIG. 3 and also in the following representations of FIGS. 4a through 4c can in this example be regarded as identical to the sensor element 80 shown and described throughout FIGS. 1 and 2. Accordingly, identical parts are designated by the same reference numerals. However, it goes without saying that other embodiments of a sensor element according to the present invention can be used for this application.

As can be seen in FIG. 3 the sensor element 98 is arranged on a part of the steering wheel 100 that undergoes a movement when the steering wheel 100 is moved, i.e. turned around its rotational axis 102. The steering wheel 100, and therefore the sensor element 98, can be moved in two directions around the rotational axis 102. From the view point of a driver, those directions can be either to the left or to the right as indicated by arrows 104 and 106. Considering a light source, like the light source 84 of FIG. 2, that is fixed with respect to the movement of the steering wheel 100, for example behind the steering wheel from the view point of the driver such that the light emitted by the light source is directed towards the backside of the steering wheel 100 and therefore directed towards the sensor element 98, a movement of the steering wheel 100 according to arrows 104 and 106 results in different relative positions between the sensor element 98 and this light source. Accordingly, the sensor element 98, especially the plurality of photo-sensors 16 within this sensor element 98, detects the light directed towards the sensor element 98 and is able to determine the light intensity on each of the photo-sensors 44 to 58. This has been explained in detail within the context of FIG. 2. As a result, every rotational position that can be reached by moving the steering wheel in either the direction of arrow 104 or the direction of arrow 106 results in a different detection pattern by the photo-sensors 44 through 58, i.e. the plurality of photo-sensors 16. As a consequence, the sensor element 98 can be used as a system for detecting the movement, since for every position of the steering wheel 100 a different light intensity pattern, or a different light intensity in general can be detected and a movement may be identified based on the change in light intensity. If, for example, a calibration took place before, every detected light intensity or light intensity pattern may be transformed into a position of the steering wheel 100, meaning a rotational position around the rotational axis 102.

This will be explained in more detail within the context of the following FIGS. 4a through 4c and the corresponding FIGS. 5a through 5c.

Figure 4A:
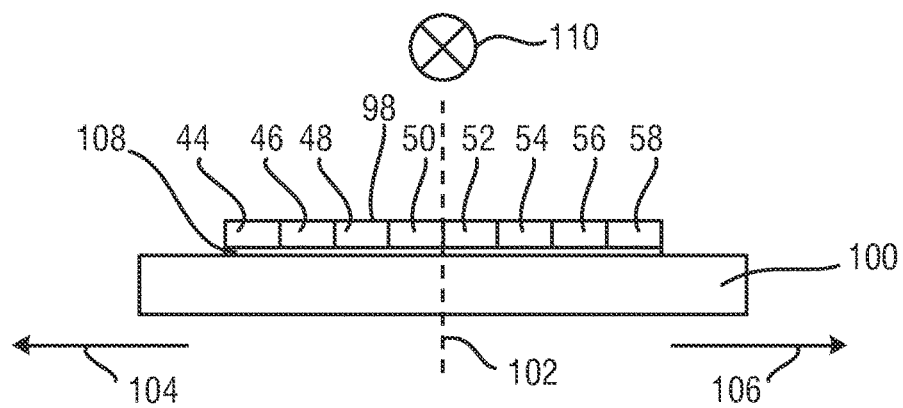
FIGS. 4a to 4c show the steering wheel of FIG. 3 in a schematic top view according to arrow IV.
Figure 4B:
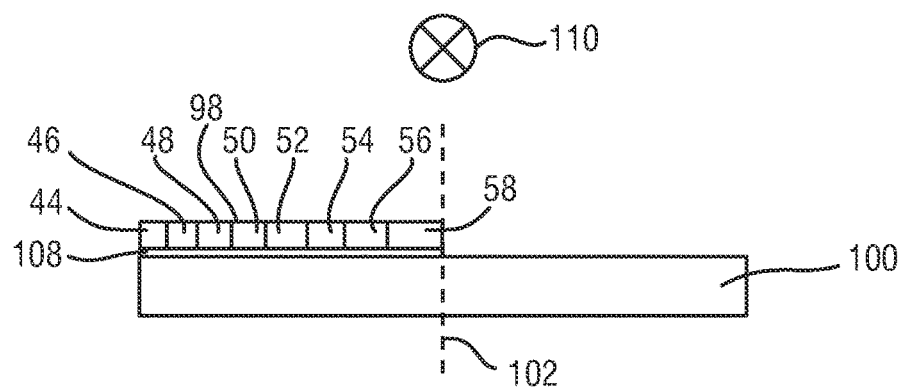
Figure 4C:
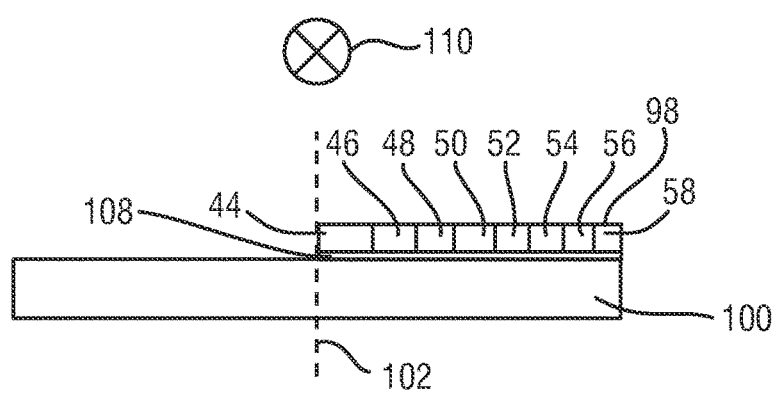

FIGS. 4a through 4c show the steering wheel 100 in the top view according to arrow IV of FIG. 3. Herein, one can see that the sensor element 98 is attached to the steering wheel 100 via an adhesive layer 108. This adhesive layer 108 can basically be realized by an adhesive tape attached to the backside of the sensor element 98 and then attached to the steering wheel 100, or the other way around. Aside from using an adhesive tape for the adhesive layer 108, or the adhesive layer 108 in general, other ways of attaching the sensor element 98 to the steering wheel 100 are of course possible, like but not limiting to clamps, screws, rivets etc.

Further, a light source 110 is shown throughout the FIGS. 4a to 4c. This light source 110 emits patterned light. This patterned light, which is preferably also infrared light, is emitted from the light source 110 in a flickering way. This means, that the light emitted by the light source 110 flashes in a predetermined frequency. By using such a flickering light the accuracy of the whole system is improved, since the light that should be detected by the sensor element 98, i.e. the plurality of photo-sensors 16, can be identified by the known frequency of flickers. Hence, other surrounding light sources, that may also emit infrared light, can be basically filtered out of the detected light by the difference between light-emitting light source 110 and turned off light source 110. Further, flickering light may be used such that a user is not able to perceive the light, even if no infrared light is used. This can be done for example by high frequencies and light-emitting periods that are chosen such that only a short pulse of light is emitted which is not perceivable by the human eye.

The different situations shown in FIGS. 4a through 4c result from the movement of steering wheel 100 in the different directions around the rotational axis 102. Herein, the light source 110 can be regarded as being stationary with respect to the movable sensor element 98. Whereas FIG. 4a shows the starting position in this embodiment, comparable to the representation of FIG. 3, which would result in a driving of the vehicle straight ahead, the representation in 4b is the result of the turning of the steering wheel 100 in the direction of arrow 104, that is to say towards the left of the driver. Accordingly, FIG. 4c shows the situation after turning the steering wheel to the right, meaning in the direction of arrow 106.

As already mentioned within the context of FIG. 2, each situation with a different relative positioning between light source 110 and the plurality of photo-sensors, in this case the sensor element 98, results in a different and also characteristic light intensity information, preferably in the form of a light intensity pattern. Such light intensity patterns are shown in the FIGS. 5a through 5c. Therein, two dimensional diagrams are shown with an abscissa 112 and an ordinate 114. The abscissa 112 represents the respective photo-sensors 44 through 58 of the plurality of photo-sensors 16, which are also present in the sensor element 98. It goes without saying that even though in the representations of FIGS. 3 through 5c only the photo-sensors 44 through 58 are shown and mentioned for the sensor element 98, the latter also comprises the other parts described within the context of sensor element 80, for example the processing unit 14 and interface 18. The ordinate 114 shown in the diagrams of FIGS. 5a through 5c represents the light intensity detected by the respective photo-sensors 44 through 58. As mentioned before, each representation of FIGS. 5a through 5c represents the detected light intensities in the situation shown throughout FIGS. 4a through 4c. In other words, FIG.

5a shows a detected light intensity of the situation in FIG. 4a. In the same way FIG. 5b corresponds to FIG. 4b and FIG. 5c to FIG. 4c.

Figure 5A:
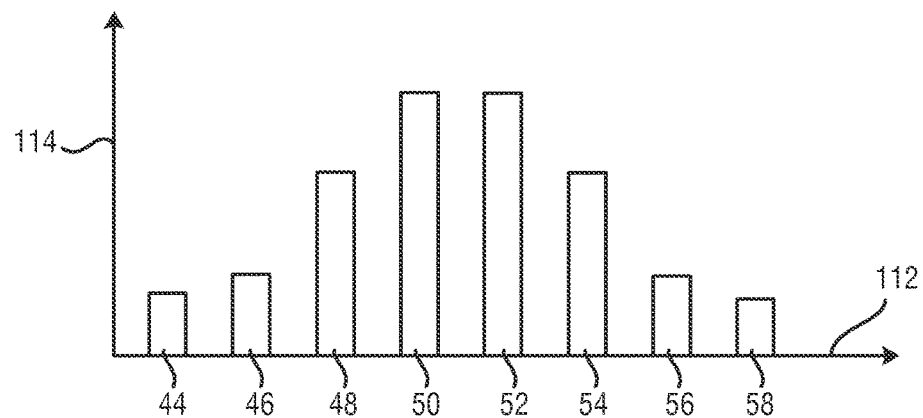
FIGS. 5a to 5c show a schematic graphical representation of the light intensity information submitted by the photo-sensors of the system according to the present invention for the steering wheel orientations shown throughout FIGS. 4a through 4c.
Figure 5B:
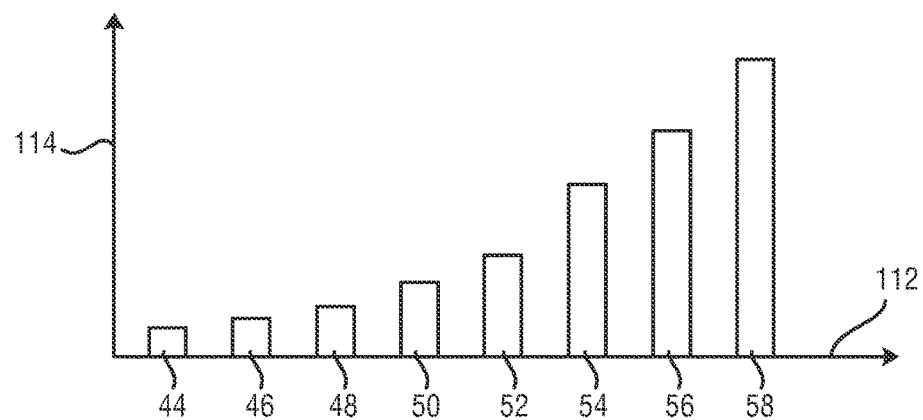
Figure 5C:
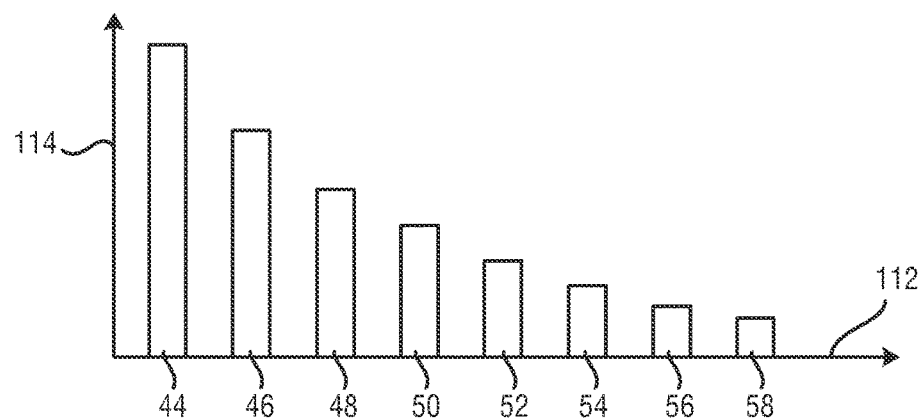

Herein, the results that were already mentioned and discussed in the context of FIG. 2 are visualized by the diagrams of FIGS. 5a through 5c. In the situation where the steering wheel 100 is not turned in FIG. 4a, photo-sensors 50 and 52 are the closest to the light source 110 whereas photo-sensors 44 and 58 are the ones that are furthest away from light source 110. This results, together with the gradually decreasing distance from photo-sensor 58 to photo-sensor 52 or photo-sensor 44 to photo-sensor 50, in the light intensity pattern shown in FIG. 5a. Therein, photo-sensors 50 and 52 show the highest light intensity which gradually decreases towards the sides, i.e. towards photo-sensors 44 and 58.

The situation in FIG. 4b is such that photo-sensor 58 is the closest to light source 110 whereas photo-sensor 44 is the furthest away. Accordingly, the distance that the light has to travel from light source 110 towards the photo-sensors increases from photo-sensor 58 to photo-sensor 44. Accordingly, the light intensity pattern, which is shown in FIG. 5b, is such that the light intensity of photo-sensor 44 is the lowest and increases gradually towards the highest light intensity detected by photo-sensor 58.

The situation in FIG. 4c is the opposite one to the representation of FIG. 4b, meaning that here photo-sensor 44 is closest whereas photo-sensor 58 is the furthest away. Accordingly, the light intensity pattern is also the other way around as shown in FIG. 5c. Photo-sensor 44 shows the highest light intensity which decreases towards the detected light intensity of photo-sensor 58.

Considering that in the turning motion around the rotational axis 102 the distances between the situations shown in FIG. 4b and FIG. 4c change gradually, each rotational position between those two examples shows a characteristic light intensity pattern. For example, if in a rotational position the photo-sensor 56 is the closest, photo-sensor 44 would be the farthest away and the light intensity pattern would be such that the highest light intensity is measured for photo-sensor 56. The next light intensities, which are a little bit more decreased, compared to the light intensity of photo-sensor 56, would be for photo-sensors 58 and 54. From that on the light intensity decreases from photo-sensor 54 towards photo-sensor 44 gradually.

Therefore, the system and processing unit shown herein and described throughout the figures allow for a determination of a movement of a control device, here the steering wheel 100. If this determination of the movement and positions is done periodically, and also stored, for example via memory 30, the movement of the control device, e.g. the steering wheel 100, can be regarded as a function over time. In this function, certain movement patterns can be recognized by known algorithms which may, for example, indicate the drowsiness of a driver of a vehicle. These algorithms and methods for recognizing and analyzing such movement patterns are for example known from R. Sayed and A. Eskandarian, "*Unobtrusive drowsiness detection by neural network learning of driver steering*", Proceedings of the Institution of Mechanical Engineers, 2001, Vol. 215, Part D, 969-975; F. Friedrichs and B. Yang, "*Drowsiness monitoring by steering and lane data*", Conference Proceedings of EUSIPCO 2010 Aug. 23-27, Aalborg, Denmark, 209-213; or A. Eskandarian and A. Mortazavi, "*Evaluation of a smart algorithm for commercial vehicle driver drowsiness detection*", Conference Proceedings of IEEE Intelligent Vehicles Symposium 2007 Jun. 13-15, Istanbul, Turkey, 553-559; which are herein fully incorporated by reference. Such patterns can therefore indicate that a driver, meaning a user of the control device, e.g. the steering wheel 100, suffers from drowsiness or gets drowsier in general. This can for example be the case if the correctional movements of the steering wheel 100, which the driver normally is used to perform on certain regular time intervals, changes or for example stops for certain time intervals. Based on this and by implementing these detection routines in the processing unit 14, especially the processor 26 and the memory 30, the afore-described system 12 or 82 for determining a movement becomes the system for detecting drowsiness of a driver of a vehicle 10, for example.

Accordingly, the detection of drowsiness of a driver of a vehicle can be realized by receiving the light intensity information from the plurality of photo-sensors 16, i.e. photo-sensors 44 to 58 in the shown examples, determining the movement of the control device, like the steering wheel 100 for example, based on this light intensity information and its change with respect to time, which was described before, and further analyzing those movements for drowsiness indicating patterns. This, as well as all other operations performed via the processing unit 14, may be realized by including respective routines in the memory 30 of the processing unit 14 which may then be executed by the processor 26 accordingly.

Therein, it is either possible to determine the movements either directly via the detected light intensity information of the plurality of photo-sensors 16 or by transforming those light intensity information into positional information of the control device, e.g. the steering wheel 100, in a first step. The change can then either be detected via the changing light intensity information or via the change in position. By the systems shown and described herein, an easy way of upgrading a car with the ability of drowsiness detection is possible, especially, by using such embodiments wherein the sensor element 80 or 98 is realized in a compact device that can for example be directly attached on the steering wheel 100. Due to working with only a certain amount of photo-sensors instead of a complex video signal, in this preferred embodiment with only eight photo-sensors 44 through 58, the resources for computing and storing can be designed relatively small and also allow for a low consumption of power. This means, that this device may even be installed without any additional cables for power supply by including small, preferably rechargeable batteries within the sensor element 80 or 98.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Processing unit for drowsiness detection with a processor, a data interface and memory, the memory storing one or more routines executable by the processor,
   wherein the processing unit is able to receive light intensity information from a plurality of photo-sensors via the data interface, the light intensity information comprising each photo-sensor's light intensity and the light intensity having more than two levels, and
   wherein the one or more routines being adapted to:
      determine the change in the light intensity information of the plurality of photo-sensors by directly comparing the light intensity information;
      determine movements of the plurality of photo-sensors relative to at least one light source based on the change of light intensity information received from the plurality of photo-sensors with respect to time, comprising:
         determine a position of the plurality of photo-sensors relative to the at least one light source based on light intensity information; and
         determine the movements based on the change in position.

2. Drowsiness detection system comprising determining a movement of a control device, the system comprising:
   a plurality of photo-sensors,
   a light source for providing light to the plurality of photo-sensors
   a processing unit, and
   an interface,
      wherein the plurality of photo-sensors is configured to move with the control device and is able to transmit light intensity information to the processing unit and the processing unit is able to receive the light intensity information from the photo-sensors, the light intensity information comprising each photo-sensor's light intensity and the light intensity having more than two levels,
      wherein the processing unit is able to provide information to a user via the interface, and
      wherein the processing unit is designed to determine the movement of the control device based on the change in the light intensity information submitted by the photo-sensors, comprising:
         determine a position of the plurality of photo-sensors relative to the light source based on light intensity information; and
         determine the movement based on the change in position.

3. System of claim 2, wherein the plurality of photo-sensors and the processing unit are combined in a sensor element comprising attaching means for attaching the sensor element on the control device.

4. System of claim 3, wherein the light source provides patterned light.

5. System of claim 4, wherein the light source provides infra-red light.

6. System of claim 2, wherein the system comprises 4-12, preferably 6-10 and more preferably 8 photo-sensors.

7. Method for detecting drowsiness of a driver of a vehicle, with the following steps:
   receiving light intensity information from a plurality of photo-sensors, the light intensity information comprising each photo-sensor's light intensity and the light intensity having more than two levels,
   determining movements based on the change of the light intensity information, comprising determining a position of the plurality of photo-sensors relative to a light source based on the light intensity information, wherein the movements are determined based on the change in position, and
   analyzing the movements for drowsiness indicating patterns.

8. Method of claim 7, further comprising the step of:
   determine the change in the light intensity information of the plurality of photo-sensors by directly comparing the light intensity information,
      wherein the movements are determined based on this comparison of light intensity information.

9. Computer program comprising program code means for causing a computer to carry out the steps of the method as claimed in claim 7 when said computer program is carried out on a computer.

* * * * *